March 14, 1967  A. S. ROSENBAUM  3,308,974
BULK MATERIAL CART

Filed July 28, 1965  4 Sheets-Sheet 1

INVENTOR.
AUGUSTINE S. ROSENBAUM
BY *Joseph G. Werner*
ATTORNEY

March 14, 1967   A. S. ROSENBAUM   3,308,974
BULK MATERIAL CART
Filed July 28, 1965   4 Sheets-Sheet 2

INVENTOR.
AUGUSTINE S. ROSENBAUM
BY Joseph G. Werner
ATTORNEY

March 14, 1967  A. S. ROSENBAUM  3,308,974
BULK MATERIAL CART
Filed July 28, 1965  4 Sheets-Sheet 3

INVENTOR.
AUGUSTINE S. ROSENBAUM
BY Joseph G. Werner
ATTORNEY

March 14, 1967

A. S. ROSENBAUM 3,308,974

BULK MATERIAL CART

Filed July 28, 1965

INVENTOR.
AUGUSTINE S. ROSENBAUM

BY Joseph G. Werner

ATTORNEY

United States Patent Office 3,308,974
Patented Mar. 14, 1967

3,308,974
BULK MATERIAL CART
Augustine S. Rosenbaum, 609 N. Page St.,
Stoughton, Wis. 53589
Filed July 28, 1965, Ser. No. 475,339
10 Claims. (Cl. 214—83.36)

This invention relates to bulk material carts and more particularly to self-propelled and self-unloading carts particularly adapted for carting bulk materials such as silage and the like.

While self-propelled and self-unloading vehicles are not broadly new, in the past, silage carts adapted for use in a cattle barn to haul silage from the silo to the cattle have been maneuvered by manually pushing or pulling the cart. This, of course, is a very strenuous task, especially when one farmhand has to maneuver the cart over a rather uneven floor or up an incline in the floor of the barn. More recently, attempts have been made to use small gasoline engine powered vehicles to pull the silage carts about cattle barns. This practice has not been widely used, however, because of the difficulty of maneuvering vehicles in tandem in the relatively cramped quarters of the ordinary cattle barn. Furthermore, the noise and the exhaust fumes of a gasoline engine powered vehicle together with the fire hazard presented by such vehicles have deterred many farmers from employing such vehicles.

Accordingly, an object of my invention is to provide a new and improved self-propelled and self-unloading cart for silage and other bulk materials which may be easily maneuvered and quickly unloaded by one person.

Another object of my invention is to provide a self-propelled and self-unloading bulk material cart having a turning radius approximately equal to the overall length of the cart.

Another object of my invention is to provide a self-propelled and self-unloading bulk material cart which is particularly well-suited for use in cattle barns in that it is battery-powered and therefore quiet in operation, free of fumes, and does not present a fire hazard.

Still another object of my invention is to provide a self-propelled and self-unloading bulk material cart which may be driven and automatically unloaded by a single workman at the front end of the cart.

A still further object of my invention is to provide a three-wheeled bulk material cart wherein power is supplied to a single pivotably mounted front wheel for both driving and steering the cart.

Still another object of my invention is to provide a self-propelled and self-unloading bulk material cart which is simple yet durable in construction and which is otherwise particularly well adapted for the carting and distribution of silage in a cattle barn.

Further objects, features and advantages of my invention will be apparent from the following detailed description taken in conjunction with the accompanying drawings showing a preferred embodiment exemplifying the principles of my invention.

Figure 1:
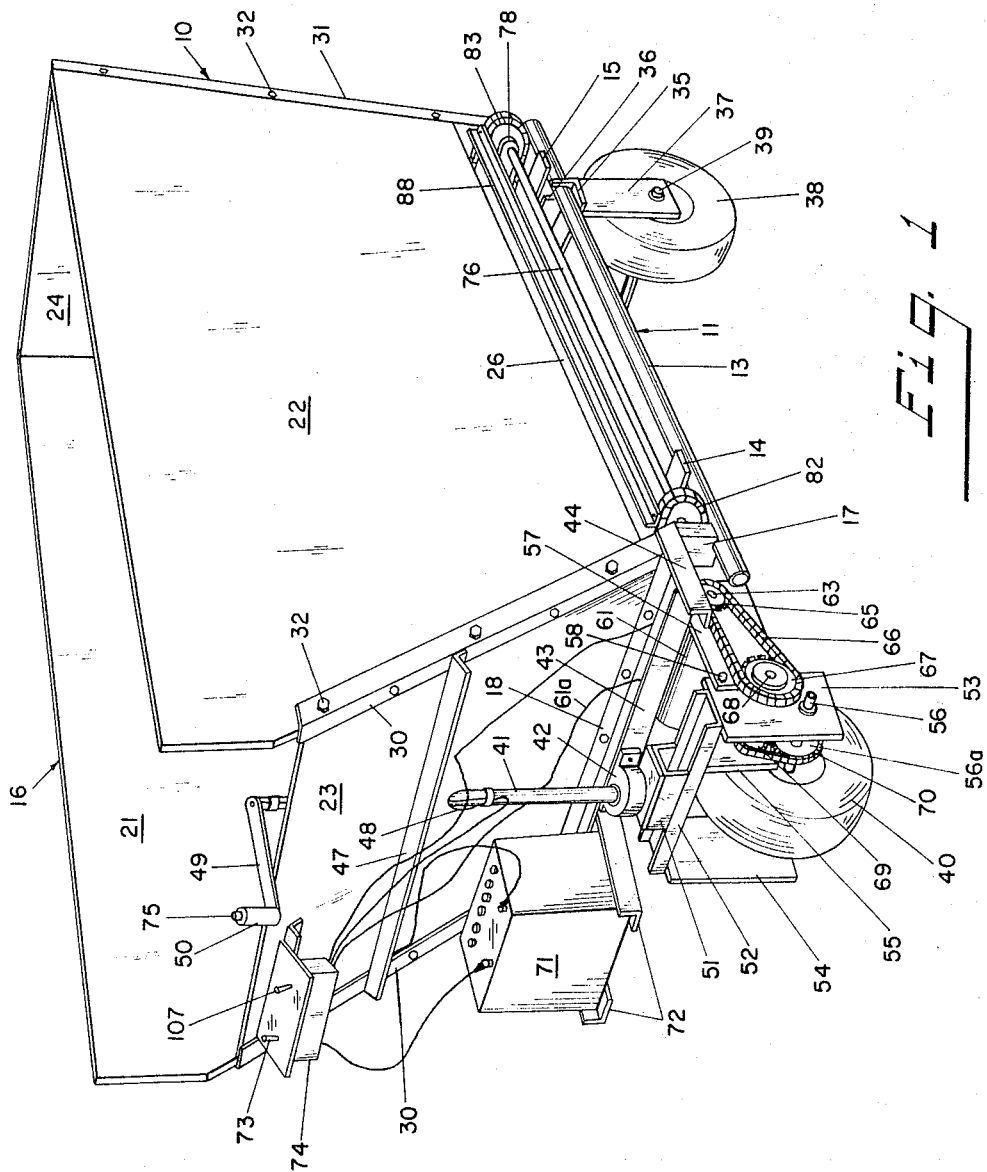
FIG. 1 is a perspective view of a self-propelled, self-unloading bulk material cart embodying my invention.
Figure 2:
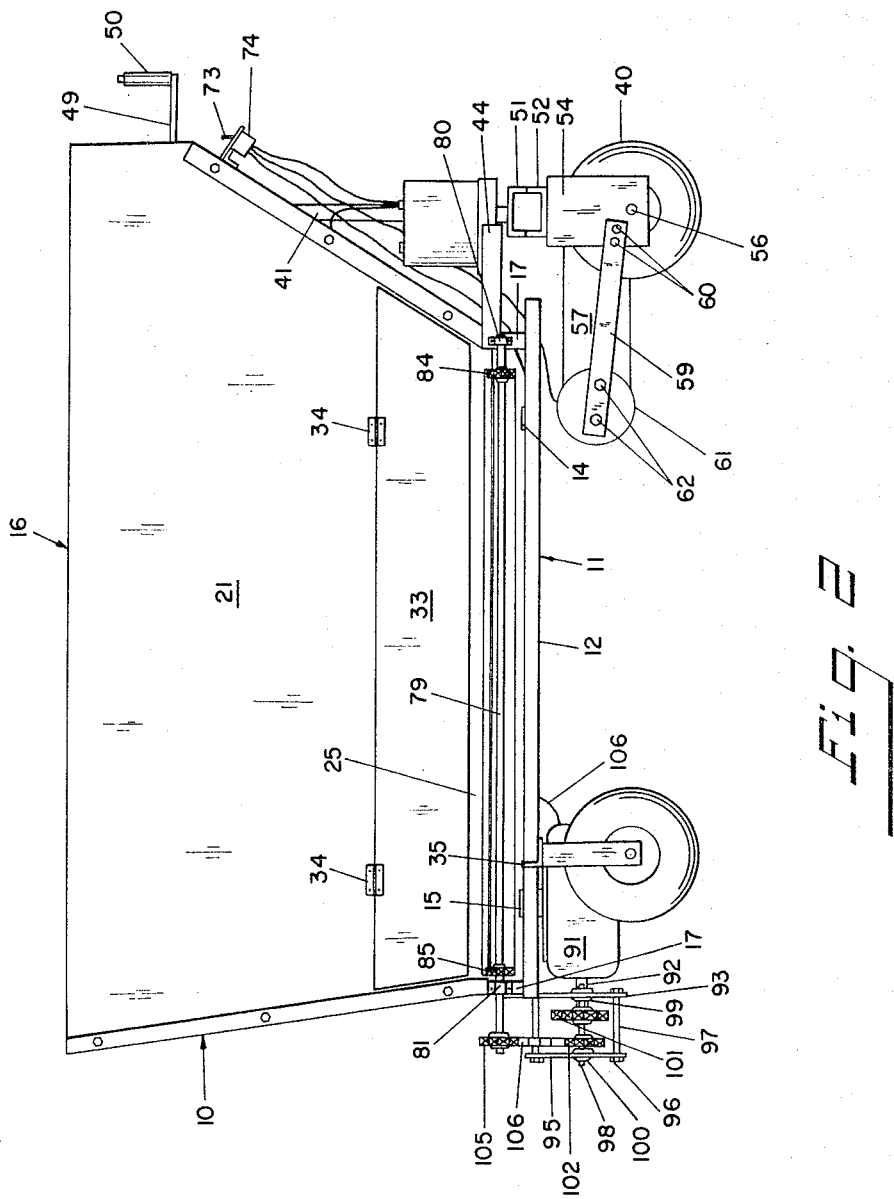
FIG. 2 is a side view from the discharge side of the bulk material cart of FIG. 1.

Referring now more particularly to the drawings wherein like numerals designate like parts throughout the several views, my bulk material cart is generally shown at 10. As best seen in FIGS. 1 and 2, my cart 10 has a chassis 11 comprising a pair of main longitudinal members 12 and 13 connected by front and rear transverse plate members 14 and 15, respectively, which are rigidly attached to the top of members 12 and 13 by welding or other suitable means of attachment.

Figure 4:
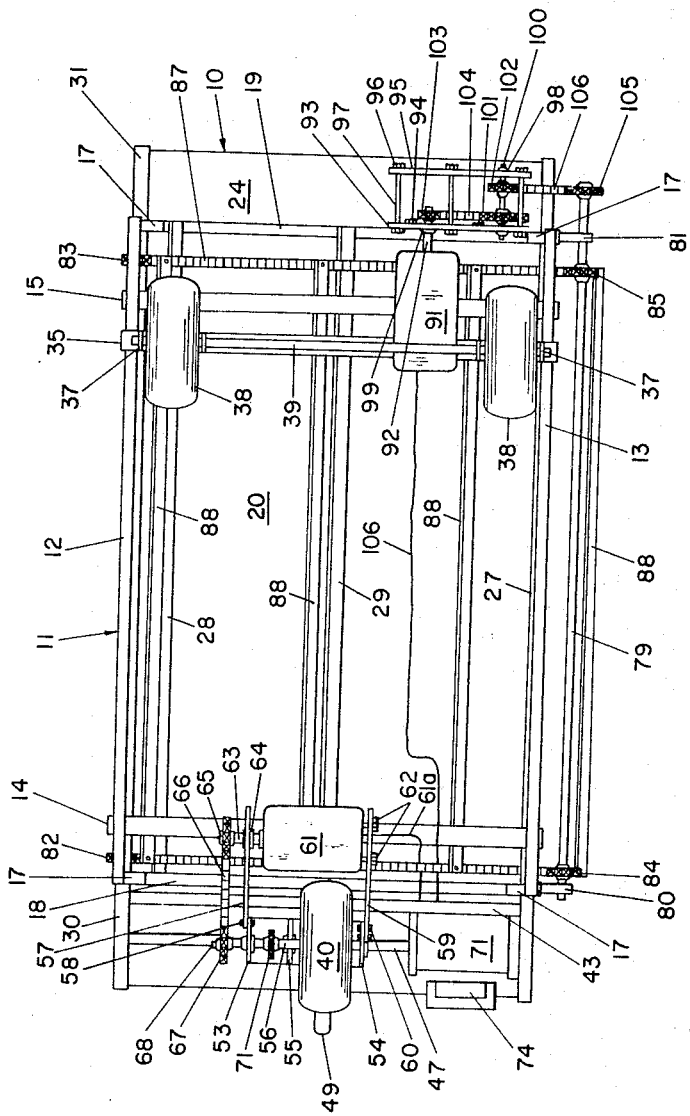
FIG. 4 is a bottom view of the bulk material cart of FIG. 1, showing the drive mechanism for the cart and the drive mechanism for the discharge conveyor.

An open topped silage box shown generally at 16 in FIGS. 1 and 2 is mounted on chassis 11 by four spacer blocks 17 shown in FIG. 4 which may be welded to members 12 and 13. As best seen in FIGS. 1 and 4, a pair of transverse angle irons 18 and 19 form the lower front end and lower rear end, respectively, of the silage box 16. Spacer blocks 17 may be welded or otherwise suitably secured to angle irons 18 and 19. Box 16 has a flat floor 20, a pair of side walls 21 and 22, front end wall 23 and a rear end wall 24. The side walls 21 and 22 are spaced above floor 20 to provide longitudinal openings 25 and 26 in the sides of the box as shown in FIGS. 1 and 2.

As best seen in FIG. 4, the edge of the floor 20 adjacent the discharge opening 25 is supported by longitudinal angle iron 27 which is suitably fixedly secured to transverse angle irons 18 and 19. At the opposite side of the box 16, floor 20 is spaced inwardly from the side of the box and is supported by a longitudinal angle iron 28 which is suitably fixedly secured to transverse angle irons 18 and 19. The center of the floor 20 may be supported by a central angle iron 29 secured to angle irons 18 and 19. The upstanding forward and rear edges of box 16 are formed by pairs of angle irons 30 and 31, respectively, which secure the side walls and end walls together as by bolts 32.

As best seen in FIGS. 1 and 2, the rear wall 24 of box 16 is inclined slightly rearwardly and extends to the top edge of side walls 21 and 22. The front wall 23 is inclined forwardly at about 60° from the horizontal and extends to a height substantially below the top edge of side walls 21 and 22.

As seen in FIG. 2, the discharge opening 25 is normally substantially closed by a door 33 which depends from spring biased hinges 34 attached to side wall 21. The hinged door 33 is adapted to be swung open against the bias of spring hinges 34 by the pressure of silage as it is moved against the door.

The floor 20, walls 20–24 and door 33 of box 16 are all preferably made of wood.

Adjacent the rear end of cart 10, an angle iron 35, as shown in FIG. 1, having U-shaped slots 36 formed therein is welded or otherwise fixedly attached to the underside of longitudinal chassis members 12 and 13. A pair of wheel support plates 37 are welded or bolted to angle iron 35. A pair of rubber tire wheels 38 are carried on rear axle 39 which extends through wheel support plates 37.

Figure 3:
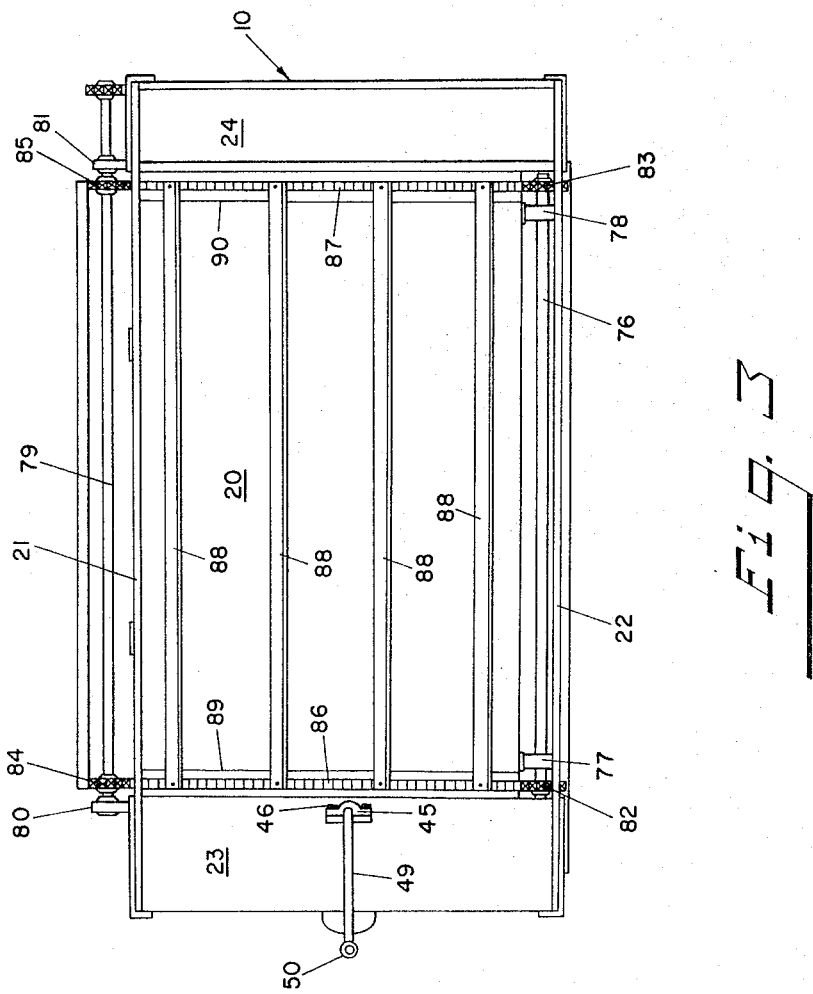
FIG. 3 is a top view of the bulk material cart shown in FIG. 1.

Referring now to FIGS. 1, 2 and 4, the front of cart 10 is supported by a single rubber tire drive wheel 40 which is pivotally mounted to the chassis for steering and driving the cart. A steering column 41 is pivotally mounted in a lower bearing 42 which is fixedly secured to a transverse angle iron 43 which is connected to a pair of forwardly extending angle iron members 44. Angle iron members 44 are welded or bolted to the forward end of the box 16. The steering column 41 is also journaled in an upper bearing 45, as shown in FIG. 3, which is fixedly secured by bolts 46 to a cross brace 47 which extends between angle irons 30 on the outside of the front wall 22 as shown in FIG. 1. Steering column 41 extends through a hole 48 in the inclined front wall 23. The steering column 41 has an upper arm 49 extending outwardly over the top of front wall 23. Column 41 carries a handle 50 thereon for steering the cart 10.

The lower end of steering column 41 is welded to the top of an inverted generally U-shaped channel member 51. Channel member 51, in turn, is welded to an elongated U-shaped channel member 52 which has three depending steel plates 53, 54 and 55 welded thereto. The front wheel 40 is rotatably supported on front axle 56 which is journaled in plates 53 and 54. As best seen in FIGS. 1 and 4, plate 53 has a rearwardly extending motor support plate 57 attached thereto by bolts 58 and as shown in FIGS. 2 and 4, plate 54 has a rearwardly extending motor support plate 59 rigidly attached thereto by bolts 60. A D.C. motor 61 is attached to plate 59 by a pair of bolts 62 and the drive shaft 63 of motor 61 is journaled in a bearing 64 mounted in motor support plate 57. Drive shaft 63 extends outwardly beyond motor support plate 57 and has a sprocket 65 mounted thereon. A drive chain 66 is trained over sprocket 65 and over a sprocket 67 mounted on a jack shaft 68 which is journalled in depending plates 53 and 55. Jack shaft 68 carries a second sprocket 69 which has a second drive chain 70 trained thereon. Drive chain 70 is also trained over a sprocket 56a fixedly mounted on axle 56 for driving the front wheel 40.

Power is supplied via line 61a to motor 61 from battery 71 which is mounted on a pair of angle irons 72 which extend forwardly from transverse angle iron 43. D.C. motor 61 is preferably a reversible motor and the direction of rotation thereof is controlled by a switch 73 mounted on switch box 74. The motor 61 is stopped and started by a push button switch 75 located on steering handle 50 so that it may be actuated by the operator as he is steering the cart.

It is apparent that my cart is driven by the front wheel 40 which is also the wheel by which the cart is steered. The front wheel drive is particularly important in that when the cart is backed up to the silo for loading, any silage which may be spilled during the loading operation will not drop about the drive wheel and, therefore, the spilled silage, which is very slippery when wet, will not prevent the drive wheel 40 from maintaining good traction with the floor. The operators of rear wheel driven vehicles would often experience great difficulty in moving such vehicles, which when loaded may weigh many hundreds of pounds, off the slippery silage droppings.

It is also important to note that the front drive wheel 40 may be turned at a right angle to the length of the cart so that the cart has a turning radius approximately equal to the overall length of the cart thus giving it great maneuverability.

My cart 10 has a conveyor for discharging silage from box 16 through discharge opening 25. As seen in FIGS. 1 and 3, an idler shaft 76 is rotatably journaled in forward and rear bearings 77 and 78, respectively, which are secured to longitudinal angle iron 28. At the opposite or discharge side of cart 10, a conveyor drive shaft 79 is rotatably journaled in forward and rear bearings 80 and 81, respectively, which are fixedly attached to spacer blocks 17.

A pair of idler sprockets 82 and 83 are secured to idler shaft 76 on the ends thereof which extend beyond bearings 77 and 78. A pair of drive sprockets 84 and 85 are secured to conveyor drive shaft 79 inwardly of bearings 80 and 81. A forward sprocket chain 86 is trained over sprockets 82 and 84 and a rear sprocket chain 87 is trained over sprockets 83 and 85. The conveyor chains 86 and 87 encircle the floor 20 of box 16 so that the top run of chains 86 and 87 may slide over the top surface of floor 20. A plurality of conveyor paddles here shown as eight elongate angle irons 88 connect forward and rear conveyor sprocket chains 86 and 87 for pushing the silage out of the discharge openings 25. As best seen in FIG. 3, a pair of metal slide plates 89 and 90 may be provided on the top surface of floor 20 to facilitate the sliding of the top run of chains 86 and 87 over the floor 20.

It will be noted in FIG. 3 that at the discharge side of cart 10, the floor 20 extends outwardly to the side wall 21 of a box and the conveyor drive shaft 79 is positioned outwardly a distance of several inches beyond the side of the box 16 so that during the discharge operation the silage will be carried beyond the side of the box. On the other hand, at the opposite side of box 16, the floor 20 is cut back so that idler shaft 76 and idler sprockets 82 and 83 may be positioned inwardly of the side of the cart.

As best shown in FIGS. 2 and 4, the conveyor drive shaft 79 is driven from a D.C. motor 91 which may be suspended from members 15 and 35 under the floor 20 of the cart. The drive shaft 92 of motor 91 extends rearwardly through a bearing 92a in a depending plate 93 which is secured by bolts 94 to transverse angle iron member 19. A second plate 95 is mounted on plate 93 by elongate bolts 96 which extend through tubular spacers 97. A jack shaft 98 is journalled in bearings 99 and 100 mounted in plates 93 and 95. Jack shaft 98 has a pair of sprockets 101 and 102 fixedly secured thereon. Sprocket 101 is connected to a drive sprocket 103 on the drive shaft 92 of motor 91 by a drive chain 104. Sprocket 102 is connected to a sprocket 105 which is fixedly mounted on the end of conveyor drive shaft 79 by sprocket chain 106. The motor 91 is thus adapted to drive shaft 79 of the discharge conveyor in such a direction that the top run of chains 86 and 87 move toward the discharge opening 25 in the side of box 16 so that the silage is discharged from the cart by conveyor paddles 88.

Power is supplied to motor 91 from battery 71 by a line 106 through the operation of a switch 107 located on switch box 74 at the front end of the cart.

In operation in a cattle barn my cart would be backed up to the discharge chute of a silo and then loaded. Switch 73, having been in its reverse position for backing the cart up to the silo, would then be switched to its forward position by the operator standing in front of the cart. The operator would then grasp steering handle 50 with the fingers of one hand and depress the push button switch 75 in the top of handle 50 with his thumb. The cart would then be driven forward by motor 61 and front wheel 40. The operator steers the cart by handle 50 and the cart will be driven forward as long as he keeps switch 75 depressed. When the cart has been steered to such a position that the discharge opening 25 in the side of the box 16 is adjacent the feeding area at a feeding station the operator releases the switch 75 thus stopping the cart. He then moves switch 107 to its on position which starts the discharge conveyor. The paddles 88 on the top run of the conveyor chains 86 and 87 push silage from the bottom of the box out the discharge opening 25. As mentioned hereinbefore the discharge conveyor extends outwardly beyond the side of the silage box at the discharge side of the cart and over the feeding area so as to minimize spillage of silage on the floor of the barn.

When the desired amount of silage has been discharged, the operator moves switch 107 to its off position thus stopping the discharge conveyor.

Spring biased door 33 will prevent additional silage from spilling out the discharge opening until the conveyor is again started.

The operator then again depresses push button switch 75 and moves on to the next feeding station.

While the use of my cart has been described in conjunction with the carting of silage in a cattle barn for exemplification, it is understood that its use is not intended to be so limited and it may be equally well employed in the handling of many bulk materials.

It is further understood that my invention is not confined to the particular construction and arrangement of parts herein illustrated and described, but embraces all such modified forms thereof as may come within the scope of the following claims.

I claim:
1. A self-propelled and self-unloading bulk material cart comprising:
   (a) a chassis,
   (b) a pair of rear wheels supporting the rear end of said chassis,
   (c) a third wheel rotatably mounted at the forward end of said chassis for driving and steering said cart,
   (d) means for manually steering said third wheel,
   (e) a box mounted on said chassis for holding bulk material, said box having a floor and a plurality of walls, said box having a discharge opening to facilitate the unloading of bulk material from said cart,
   (f) an endless conveyor chain adapted to be driven over the top surface of the floor of said box toward said discharge opening and
   (g) means for driving said third wheel and for driving said conveyor chain for discharging bulk material from said cart through said discharge opening.

2. The self-propelled and self-unloading material cart as specified in claim 1 wherein said box has an open top and a substantially flat floor.

3. The self-propelled and self-unloading bulk material cart as specified in claim 1 wherein one of said walls is spaced above the floor of said box to provide said discharge opening to facilitate the unloading of bulk material therefrom.

4. A self-propelled and self-unloading bulk material cart comprising:
   (a) a chassis,
   (b) a pair of wheels supporting the rear end of said chassis,
   (c) a third wheel pivotably mounted at the forward end of said chassis for steering said cart,
   (d) means for manually steering said third wheel,
   (e) a first electric motor for driving said third wheel, said first motor being adapted to be powered from a battery mounted on said chassis,
   (f) a manually operable switch for energizing said first motor,
   (g) a box supported on said chassis for holding bulk material, said box having a floor and a plurality of walls, said box having a discharge opening to facilitate unloading of bulk material from said cart,
   (h) an endless conveyor chain adapted to be driven over the top surface of the floor of said box toward said discharge opening,
   (i) a second electric motor mounted on said chassis for driving said endless conveyor chain for discharging bulk material from said cart through said discharge opening, said second motor being adapted to be energized from said battery mounted on said chassis, and
   (j) a manually operable switch for supplying power from said battery to said second motor.

5. A self-propelled and self-unloading bulk material cart comprising:
   (a) a chassis,
   (b) a pair of wheels supporting the rear end of said chassis,
   (c) a steering shaft pivotably mounted at the front end of said chassis, said steering shaft having a third wheel and a motor for driving said third wheel and a motor for driving said third wheel mounted at its lower end for pivotal movement therewith, said motor being adapted to be powered from a battery mounted on said chassis,
   (d) an open-topped box supported on said chassis for holding bulk material, said box having a substantially flat floor and a plurality of walls, one of said walls being spaced above said floor to provide a discharge opening to facilitate the unloading of bulk material from said cart,
   (e) an endless conveyor chain adapted to be driven over the top surface of the floor of said box toward said opening,
   (f) a second motor mounted on said chassis for driving said conveyor chain for discharging bulk material from said cart through said opening, said second motor being adapted to be powered from said battery mounted on said chassis.

6. The self-propelled and self-unloading bulk material cart as specified in claim 5 wherein said steering shaft has a transversely disposed steering arm for pivoting said shaft, said steering arm having a manually operable switch for energizing said first motor.

7. A self-propelled and self-unloading bulk material cart comprising:
   (a) a chassis,
   (b) a pair of wheels supporting the rear end of said chassis,
   (c) an open-topped box supported on said chassis for holding said bulk material, said box having a substantially flat floor, a pair of side walls, a rear wall and a forwardly inclined front wall, one of said side walls being spaced above said floor to provide a discharge opening to facilitate side unloading of bulk material from said cart,
   (d) an upright steering shaft pivotably mounted at the front end of said chassis and extending upwardly through the forwardly inclined front wall, said steering shaft having a third wheel and a motor for driving said third wheel mounted at its lower end for pivotal movement therewith, said first motor being adapted to be powered from a battery mounted on said chassis under said front wall,
   (e) an endless conveyor chain adapted to be driven over the top of the floor of said box toward said opening, and
   (f) a second electric motor mounted on said chassis for driving said conveyor chain, for discharging bulk material from said box through said opening, said second motor being adapted to be powered from said battery.

8. The self-propelled and self-unloading bulk material cart as specified in claim 7 wherein said endless conveyor chain comprises a pair of endless sprocket chains having a plurality of elongate paddles connecting said sprocket chains.

9. A self-propelled and self-unloading bulk material cart as specified in claim 7 including a hinged side panel for closing said discharge opening.

10. A self-propelled and self-unloading bulk material cart comprising:
   (a) a chassis,
   (b) a pair of wheels supporting the rear end of said chassis,
   (c) a steering shaft pivotably mounted at the front end of said chassis, said steering shaft having a third wheel and a motor for driving said third wheel mounted at its lower end for pivotal movement therewith,
   (d) an open-topped box supported on said chassis for holding bulk material, said box having a substantially flat floor, a pair of side walls, and a pair of end walls, each of said side walls being spaced above said floor to provide an opening at each side of the cart above the floor.
   (e) an elongated shaft rotatably mounted at each side of the cart adjacent said openings, each of said shafts having a forward and a rear sprocket,
   (f) an endless sprocket chain trained over said forward sprockets and encircling the floor of said box,
   (g) a second endless sprocket chain trained over said rear sprockets and encircling the floor of said box,
   (h) a plurality of paddles attached to said endless sprocket chains and extending therebetween, (i) means for driving said elongated shafts for discharging bulk material from said box through one of said openings.

References Cited by the Examiner
UNITED STATES PATENTS

| | | | |
|---|---|---|---|
| 1,637,601 | 10/1927 | Bussey | 222—415 X |
| 1,809,796 | 6/1931 | Beardsley et al. | 214—83.36 X |
| 2,591,556 | 4/1952 | Knutson | 214—83.36 |
| 2,706,008 | 4/1955 | Voigt | 180—26 X |
| 2,815,083 | 12/1957 | Ellingsworth | 180—26 X |
| 3,064,837 | 11/1962 | Manney | 214—83.36 |
| 3,099,326 | 7/1963 | Weigel et al. | 180—26 |

ROBERT B. REEVES, *Primary Examiner.*

KENNETH N. LEIMER, *Assistsant Examiner.*